United States Patent
Enomoto

(10) Patent No.: US 8,149,434 B2
(45) Date of Patent: Apr. 3, 2012

(54) IMAGE OUTPUT APPARATUS, IMAGE OUTPUT METHOD, AND COMPUTER READABLE MEDIUM

(75) Inventor: Naoyuki Enomoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1006 days.

(21) Appl. No.: 12/113,982

(22) Filed: May 2, 2008

(65) Prior Publication Data

US 2009/0128863 A1 May 21, 2009

(30) Foreign Application Priority Data

Nov. 20, 2007 (JP) ................................ 2007-300840

(51) Int. Cl.
 *G06K 15/00* (2006.01)
 *G06F 3/12* (2006.01)
(52) U.S. Cl. ...................... 358/1.14; 358/1.15; 358/1.13
(58) Field of Classification Search .................. None
 See application file for complete search history.

(56) References Cited

U.S. PATENT DOCUMENTS

| 2006/0200704 A1 | 9/2006 | Takahashi et al. | |
| 2007/0242301 A1 | 10/2007 | Tsuchie et al. | |
| 2007/0253013 A1* | 11/2007 | Shudo | 358/1.14 |
| 2009/0073493 A1* | 3/2009 | Kuramochi | 358/1.16 |
| 2010/0188687 A1* | 7/2010 | Fukano et al. | 358/1.15 |

FOREIGN PATENT DOCUMENTS

| JP | 2004-080686 A | 3/2004 |
| JP | 2005-254736 A | 9/2005 |
| JP | 2005-305727 A | 11/2005 |
| JP | 2006-74358 A | 3/2006 |
| JP | 2006-229499 A | 8/2006 |
| JP | 2007-104073 A | 4/2007 |
| JP | 2007-149106 A | 6/2007 |
| JP | 2007-286337 A | 11/2007 |

OTHER PUBLICATIONS

Japanese Office Action dated Feb. 9, 2010 for Japanese Patent Application No. 2007-300840 and English-language translation.
Japanese Office Action dated Mar. 8, 2011 for corresponding Japanese patent application No. 2007-300840.

* cited by examiner

*Primary Examiner* — Dov Popovici
(74) *Attorney, Agent, or Firm* — Sughrue Mion, PLLC

(57) ABSTRACT

An image output apparatus includes: a memory configured to store user identification data; a receiver configured to receive image data and user identification data; an input unit by use of which a user inputs his/her user identification data; a clock; and an image forming unit that: if a time indicated by the clock is within a predetermined standby time, suspends outputting of an image represented by image data received by the receiver; and if user identification data input using the input unit during the predetermined standby time is stored in the memory, outputs an image represented by image data, which is associated with the input user identification data, from among items of image data received by the receiver and not yet output.

10 Claims, 7 Drawing Sheets

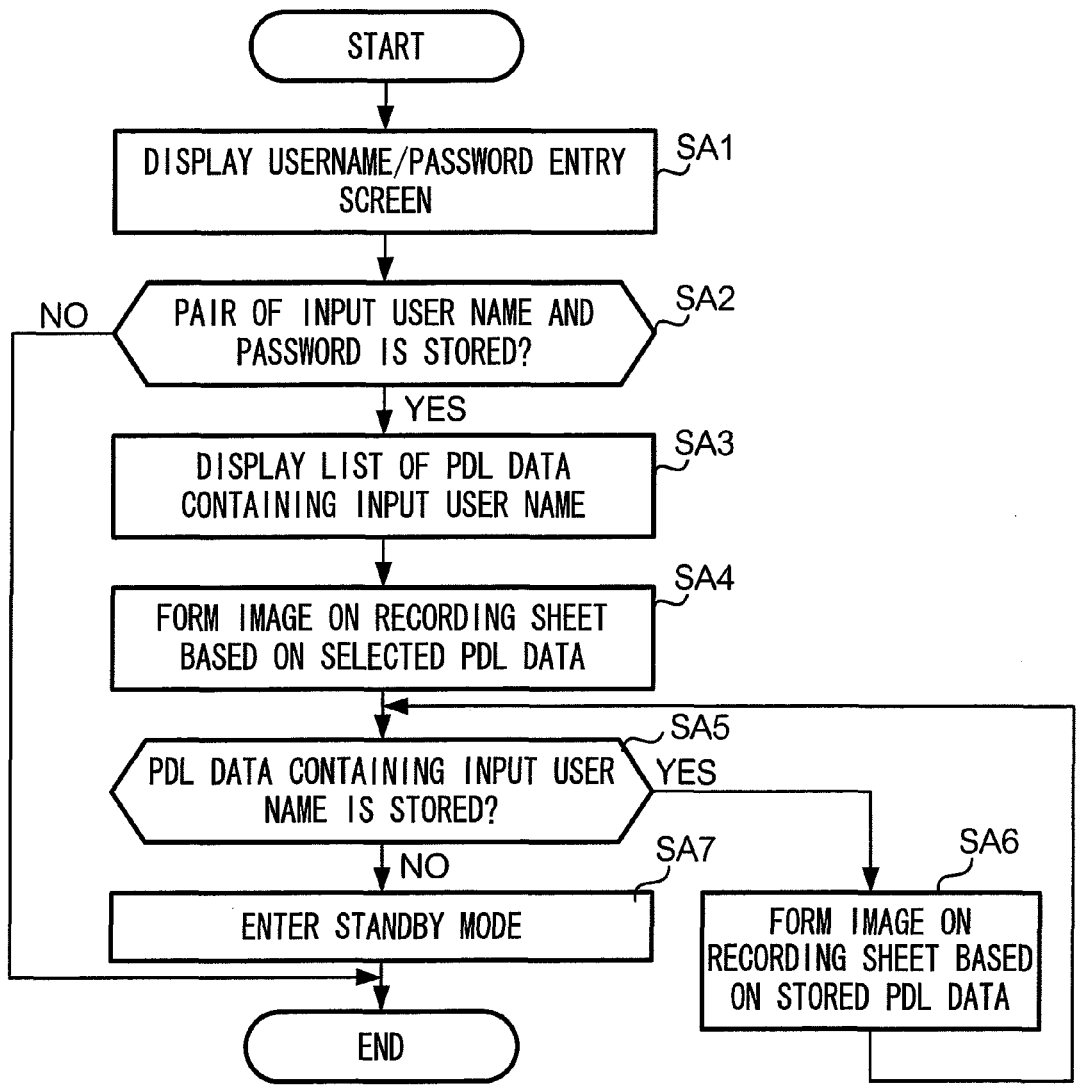

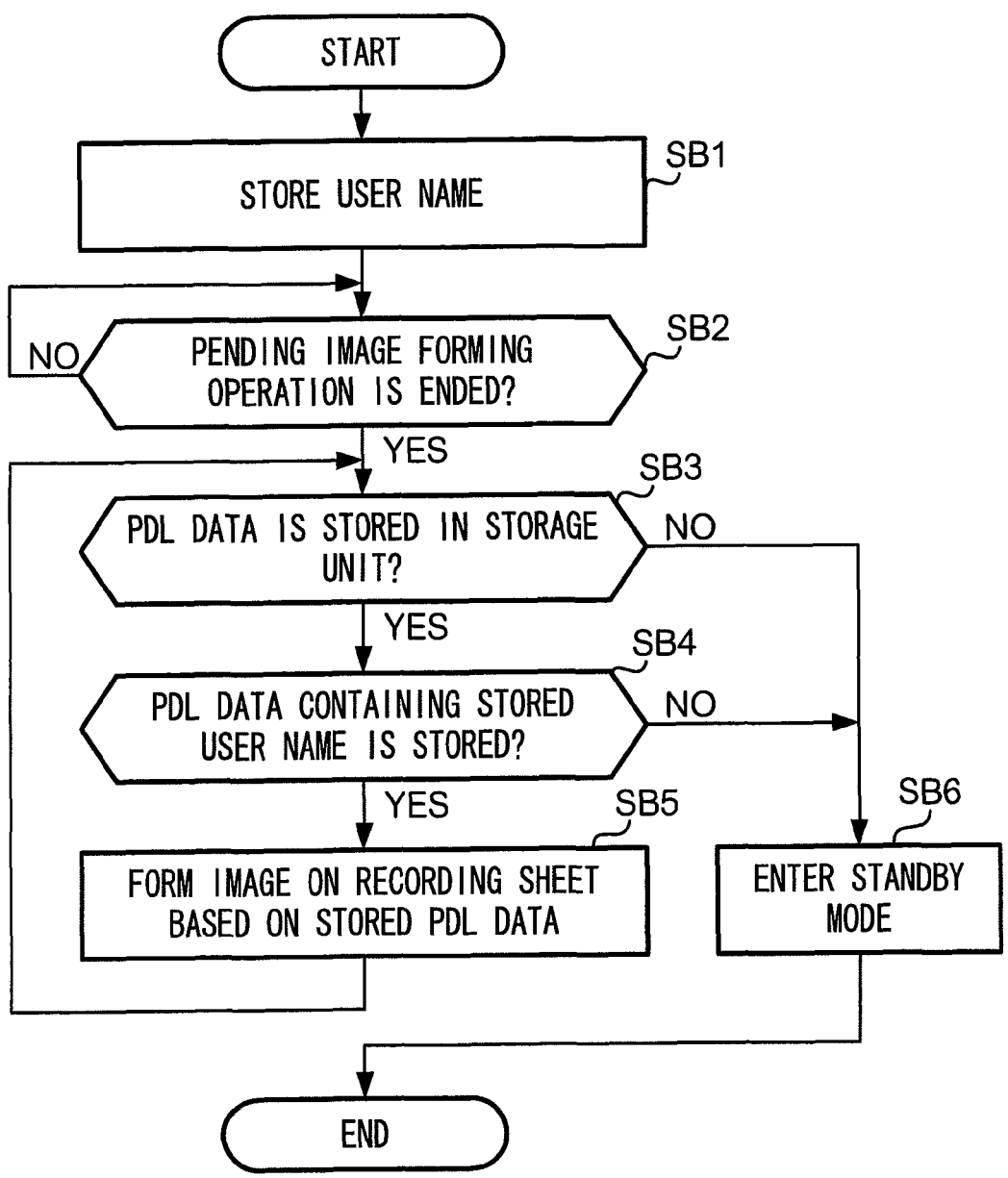

IMAGE OUTPUT APPARATUS, IMAGE OUTPUT METHOD, AND COMPUTER READABLE MEDIUM

CROSS-REFERENCE TO RELATED APPLICATIONS

This application is based on and claims priority under 35 USC 119 from Japanese Patent Application No. 2007-300840 filed on Nov. 20, 2007.

BACKGROUND

Technical Field

The present invention relates to an image output apparatus, an image output method, and a computer readable medium.

SUMMARY

An aspect of the present invention provides an image output apparatus including: a memory configured to store user identification data; a receiver configured to receive image data and user identification data; an input unit by use of which a user inputs his/her user identification data; a clock; and an image forming unit that: if a time indicated by the clock is within a predetermined standby time, suspends outputting of an image represented by image data received by the receiver; and if user identification data input using the input unit during the predetermined standby time is stored in the memory, outputs an image represented by image data, which is associated with the input user identification data, from among items of image data received by the receiver and not yet output.

BRIEF DESCRIPTION OF THE DRAWINGS

Exemplary embodiments of the present invention will now be described in detail with reference to the following figures, wherein:

FIG. 7 is a diagram illustrating a screen displayed on image forming apparatus 1;

FIG. 8 is a flowchart showing an operation performed by image forming apparatus 1;

FIG. 9 is a flowchart showing an operation performed by image forming apparatus 1;

DETAILED DESCRIPTION

Exemplary Embodiment

Figure 1:
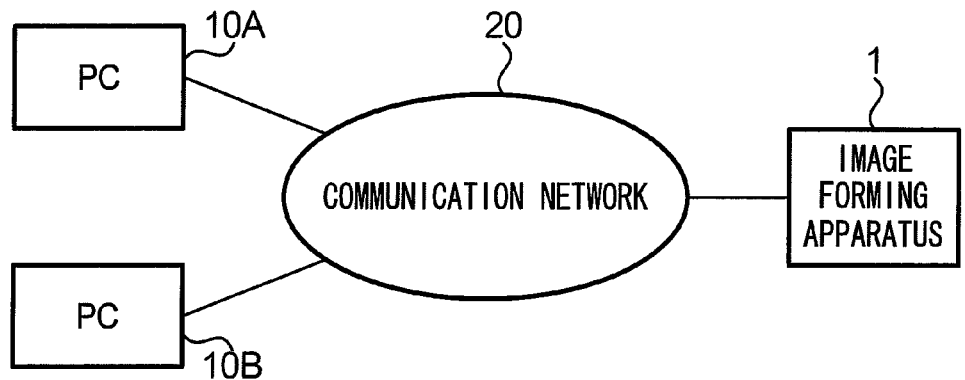
FIG. 1 is a diagram illustrating a configuration of a system including image forming apparatus 1 according to an exemplary embodiment of the present invention.

FIG. 1 is a diagram illustrating a configuration of a system including image forming apparatus 1 according to an exemplary embodiment of the present invention. As shown in the drawing, the system includes image forming apparatus 1, PCs 10A and 10B, and communication network 20; and image forming apparatus 1 and PCs 10A and 10B are able to communicate with each other via communication network 20.

Image forming apparatus 1 is an image forming apparatus (or image output apparatus) with multiple functions such as a copy function, an image output function for outputting an image on a recording sheet on the basis of received data, and a facsimile function. Image forming apparatus 1 also has a standby function for standing by without outputting an image on a recording sheet during a set time (or standby time).

PCs (Personal Computers) 10A and 10B are computers with a display for displaying characters or images, and execute application programs on an operating system. PCs 10A and 10B store, as an application program, a word processor program for realizing a function of a word processor and a browser program for realizing a function of a Web browser for browsing a Web page.

PCs 10A and 10B also have a function of generating PDL (Page Description Language) data for instructing image forming apparatus 1 to output an image on a recording sheet, that is described in page description language. PCs 10A and 10B send PDL data for instructing image forming apparatus 1 to output an image of a document prepared using a word processor program or a Web page displayed using a Web browser, to image forming apparatus 1 via communication network 20 in response to an operation by a user.

(Configuration of Image Forming Apparatus 1)

Figure 2:
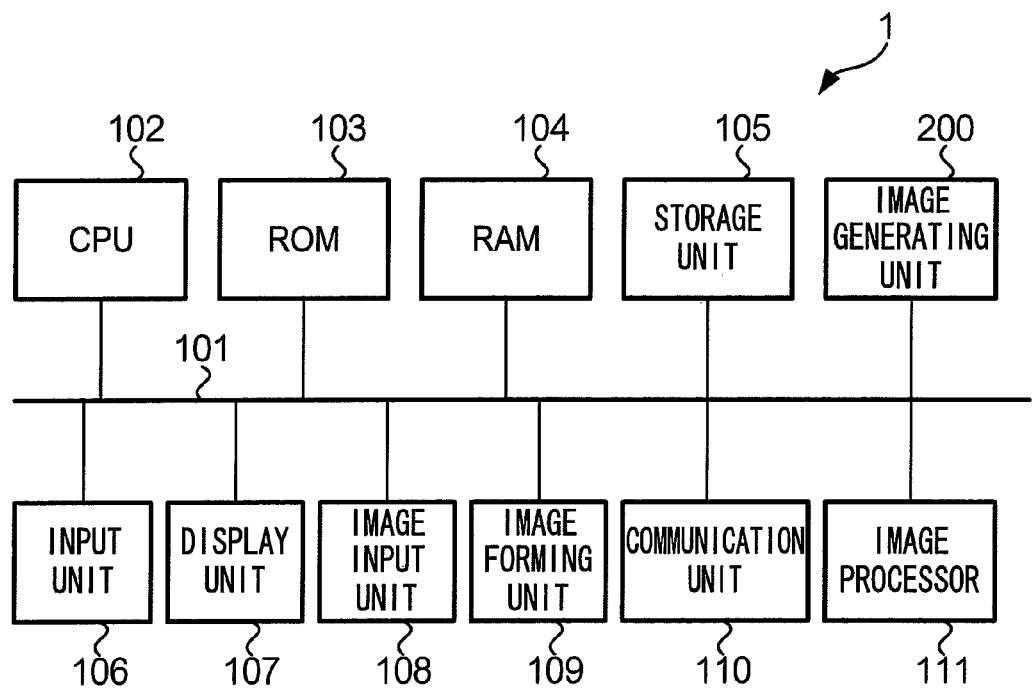
FIG. 2 is a block diagram illustrating a hardware configuration of image forming apparatus according to the exemplary embodiment.

FIG. 2 is a block diagram illustrating a configuration of image forming apparatus 1 according to an exemplary embodiment of the present invention. As shown in the drawing, components of image forming apparatus 1 are connected to bus 101, and they exchange data via bus 101.

Image input unit 108 includes a reading mechanism for optically reading a document and an automatic document feeder for feeding a document to the reading mechanism. Documents set on the automatic document feeder are fed onto a platen glass included in the reading mechanism, one after another. The reading mechanism subjects a document placed on the platen glass by the automatic document feeder to light. The reading mechanism receives light reflected by the document using a CCD (Charge Coupled Device), and generates image data of the document. Image data generated by the reading mechanism is stored in storage unit 105.

Input unit 106 includes keys for operating image forming apparatus 1 such as numeric keys, arrow keys, and a start key for instructing the start of an operation. A user uses the keys to input an instruction for image forming apparatus 1 or to configure settings of image forming apparatus 1. Display unit 107 includes a display such as a liquid crystal display, and displays a menu screen for operating image forming apparatus 1 or messages under control of CPU 102.

Communication unit 110 is connected to communication network 20. Communication unit 110 serves as a communication interface for exchanging data with PCs 10A and 10B via communication network 20.

Image processor 111 subjects an image represented by input image data to image processing such as tone correction and a screening process. The processor generates on the basis of the image subjected to an image processing, image data of images of each color Y (Yellow), M (Magenta), C (Cyan), and K (Black), and outputs it to image forming unit 109.

Image generating unit 200 is a DSP (Digital Signal Processor), and has a function of generating an image on the basis of PDL data described in page description language or image data generated by image input unit 108.

Image forming unit 109 includes image forming mechanisms (not shown) for forming a toner image on a recording sheet in an electrophotographic manner. The image forming mechanisms employ an intermediate transfer system, and each forms a toner image of a color Y, M, C, or K. Each image forming mechanism forms an electrostatic latent image on a photoreceptor on the basis of input image data, and thereafter attaches toner to the photoreceptor to form a toner image of a color Y, M, C, or K. A toner image formed on the photoreceptor is transferred to an intermediate transfer belt, and the transferred toner image is further transferred to a recording sheet provided from a recording sheet storage unit. A toner image transferred to a recording sheet is fixed on the sheet by heat and pressure, and thereafter the recording sheet is ejected from image forming apparatus 1.

Storage unit 105 has a hard disk, and stores image data generated by image input unit 108 or data received by communication unit 110.

Storage unit 105 also stores standby time data representing standby time described above. Storage unit 105 stores, if a standby time is between 19:00 and 7:59 the following day, data of "19:00-7:59" as standby time data. Standby time data is input by a user using input unit 106, and is stored in storage unit 105.

Storage unit 105 also stores a pair of a user name of a user using image forming apparatus 1 and a password of the user. Storage unit 105 stores, if a user name of user A using image forming apparatus 1 is "userA" and a password is "AAA", a pair of data "userA" and "AAA", and if a user name of user B using PC 10B and image forming apparatus 1 and a password is "BBB", a pair of data "userB" and "BBB".

ROM 103 stores a control program to be executed by CPU 102. CPU 102 retrieves the control program from ROM 103, and executes the program while using RAM 104 as a work area. If the control program is executed by CPU 102, components of image forming apparatus 1 are controlled by CPU 102 so that an image output function and a copy function for outputting an image on the basis of stored data, a facsimile function, a clock function for measuring the time, and a standby function are realized.

[Operations of Exemplary Embodiment]

Operations of the present exemplary embodiment will be described. Specifically, operations that are characteristic of the present invention; namely, an operation performed when image forming apparatus 1 is operated directly by a user during a standby time and an operation performed when a standby time starts while image forming apparatus 1 is in the process of outputting an image, will be described.

(Operation Performed when Image Forming Apparatus 1 is Operated Directly by a User During a Standby Time)

Figure 3:
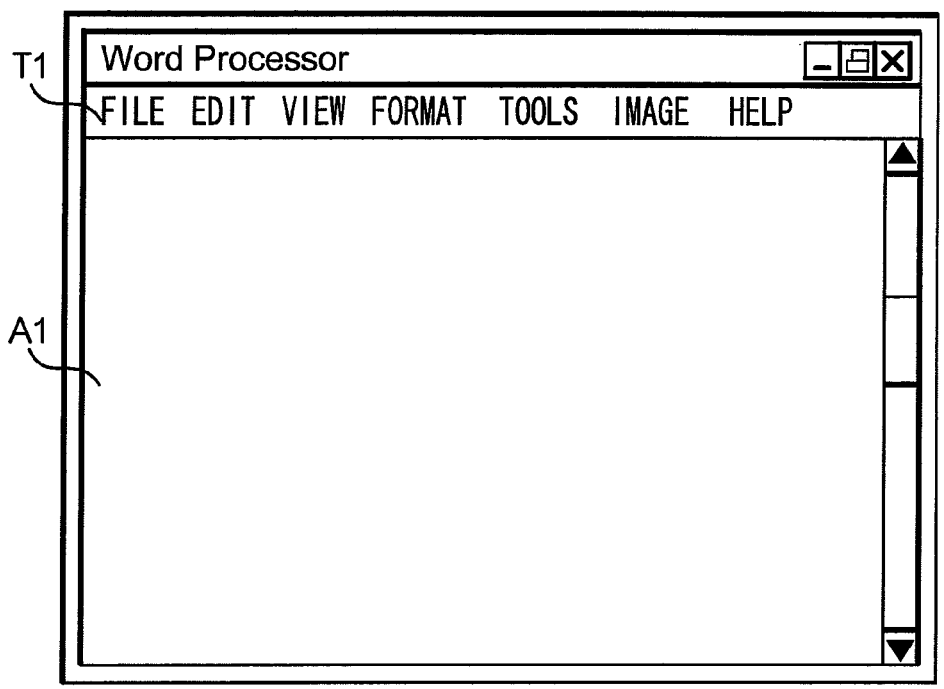
FIG. 3 is a diagram illustrating a screen displayed on PC 10A or 10B.
Figure 4:
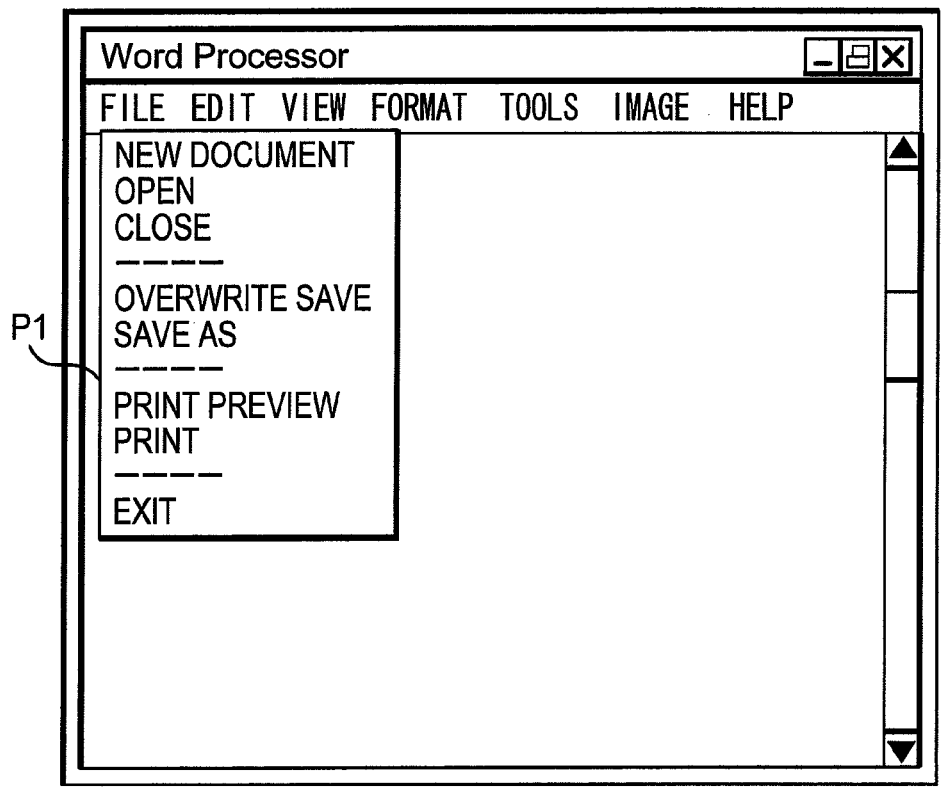
FIG. 4 is a diagram illustrating a screen displayed on PC 10A or 10B.
Figure 5:
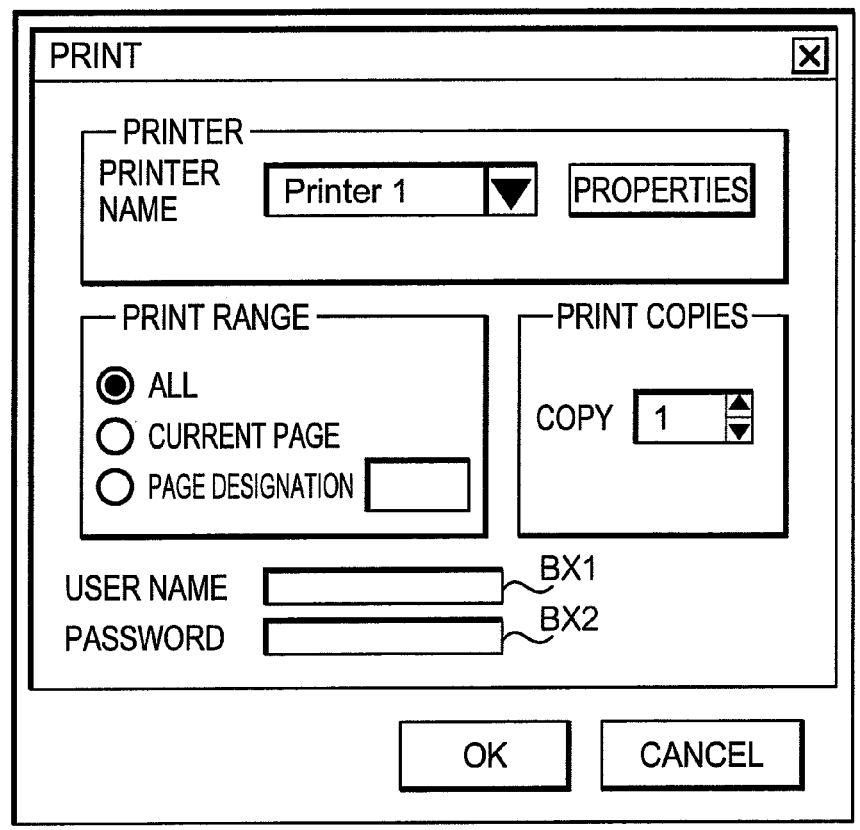
FIG. 5 is a diagram illustrating a screen displayed on PC 10A or 10B.

If user A operates PC 10A to instruct execution of a word processor program, the program is executed, and a screen with entry field A1 in which characters or images are input and toolbar T1 is displayed, as shown in FIG. 3. User A inputs text in entry field A1 using a keyboard and/or a mouse, and if clicking item "File" on toolbar T1, pull-down menu P1 is displayed as shown in FIG. 4. If user A clicks item "Print" in pull-down menu P1, a menu screen for configuring settings for printing is displayed, as shown in FIG. 5.

If user A inputs his/her user name "userA" in text box BX1 of the menu screen, inputs his/her password "AAA" in text box BX2, and clicks an OK button on the screen, PC 10A generates PDL data for instructing image forming apparatus 1 to form an image of the text input in entry field A1 on a recording sheet, in page description language.

The PDL data (hereinafter referred to as "PDL data 11") contains an image output instruction for instructing image forming apparatus 1 to form an image of the text input in entry field A1 on a recording sheet, and data indicating a position of the text in entry field A1, font color, font size, font, the text in entry field A1, the user name "userA" input in text box BX1, and the password "AAA" input in text box BX2. PC 10A sends PDL data 11 to image forming apparatus 1 via communication network 20.

PDL data 11 is received by communication unit 110 of image forming apparatus 1, and if a time of the receipt of the data is within a standby time, the data is stored in storage unit 105. Image forming apparatus 1 does not perform an image output operation on the basis of received PDL data 11.

Figure 6:
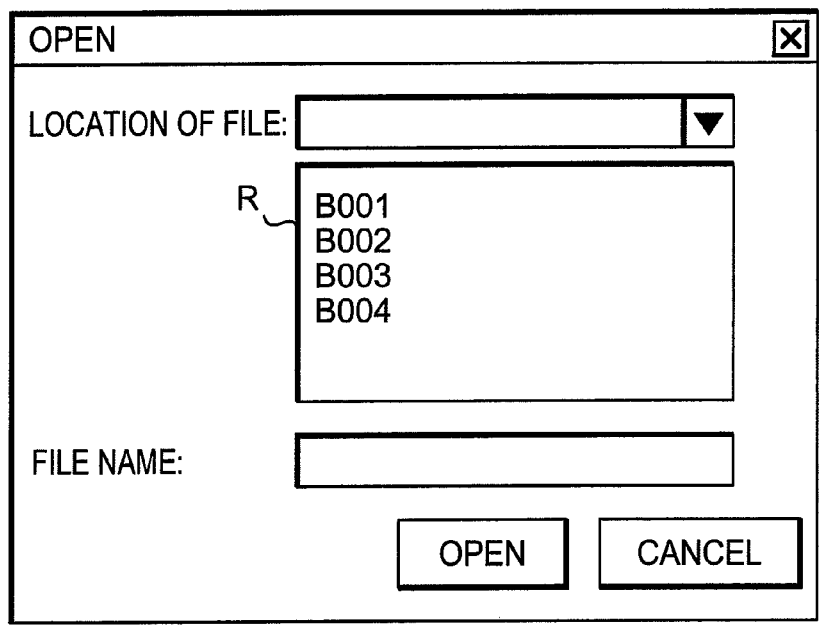
FIG. 6 is a diagram illustrating a screen displayed on PC 10A or 10B.

Subsequently, user A clicks item "File" on toolbar T1 while a screen of FIG. 3 is displayed on PC 10A, pull-down menu P1 is displayed as shown in FIG. 4. If user A clicks item "Open" in pull-down menu P1, a menu screen for opening a file is displayed, as shown in FIG. 6. If user A clicks a file name of a pre-prepared document file, and clicks an "Open" button, text stored in the document file is displayed in entry field A1.

If user A invokes a menu screen shown in FIG. 5 for configuring settings for printing, inputs his/her user name "userA" in text box BX1 of the menu screen, inputs his/her password "AAA" in text box BX2, and clicks an OK button on the screen, PC 10A generates PDL data for instructing image forming apparatus 1 to form an image of the text input in entry field A1 on a recording sheet, in page description language. PC 10A sends the PDL data (hereinafter referred to as "PDL data 12") to image forming apparatus 1 via communication network 20.

PDL data 12 is received by communication unit 110 of image forming apparatus 1, and if a time of the receipt of the data is within a standby time, the data is stored in storage unit 105.

After PDL data 12 is received by image forming apparatus 1, user B, who uses PC 10B in which a word processor program is running, inputs text in entry field A1 using a keyboard and/or a mouse, and if invoking a menu screen shown in FIG. 5 for configuring settings for printing, the menu screen is displayed. If user B inputs his/her user name "userB" in text box BX1 of the menu screen, inputs his/her password "BBB" in text box BX2, and clicks an OK button on the screen, PC 10B generates PDL data for instructing image forming apparatus 1 to form an image of the text input in entry field A1 on a recording sheet, in page description language.

The PDL data (hereinafter referred to as "PDL data 13") contains an image output instruction for instructing image forming apparatus 1 to form an image of the text input in entry field A1 on a recording sheet, and data indicating a position of the text in entry field A1, font color, font size, font, the text in entry field A1, the user name "userB" input in text box BX1, and the password "BBB" input in text box BX2. PC 10B sends PDL data 13 to image forming apparatus 1 via communication network 20.

PDL data 13 is received by communication unit 110 of image forming apparatus 1, and if a time of the receipt of the data is within a standby time, the data is stored in storage unit 105.

As a result of the above process, PDL data 11, PDL data 12, and PDL data 13 are stored in image forming apparatus 1. However, since the times of receipt of the pieces of data are within a standby time, image output operations on the basis of the pieces of data have not been performed.

If user A wishes to cause image forming apparatus 1 to output images on the basis of PDL data 11 and PDL 12, s/he performs an operation for enabling image forming apparatus 1 to carry out an image output operation. Specifically, user A operates input unit 106 to cause display unit 107 to display a screen with text boxes (see FIG. 7) in which a user name and a password are to be input (step SA1 of FIG. 8). In the text boxes user A inputs his/her user name "userA" and his/her password "AAA", and inputs a start key of input unit 106. If the pair of the user name and the password is stored in storage unit 105 of image forming apparatus 1, the apparatus becomes able to carry out an image output operation on the basis of PDL data containing the user name "userA". As described above, since the pair of the user name "userA" and the password "AAA" is stored in storage unit 105 (step SA2; YES), image forming apparatus 1 becomes able to carry out an image output operation.

After becoming able to carry out an image output operation, image forming apparatus 1 searches storage unit 105 for PDL data containing the user name "userA", and causes display unit 107 to display a result of the search (step SA3). Since storage unit 105 stores PDL data 11 and PDL data 12 as PDL data containing the user name "userA", the file names of PDL data 11 and PDL 12 are displayed. If user A operates input unit 106 to select PDL data 11, PDL data 11 stored in storage unit 105 is provided to image generating unit 200, and deleted from storage unit 105.

On receipt of PDL data 11, image generating unit 200 generates image data of an image in which text contained in PDL data 11 is arranged on the basis of data indicating a position of the text in entry field A1. The generated image data is provided to image processor 111. On receipt of the image data, image processor 111 subjects an image represented by the image data to image processing such as a tone correction and a screening process, and on the basis of the image subjected to an image processing, generates image data of images of each color Y, M, C, and K. The generated image data is provided to image forming unit 109. On receipt of the image data, image forming unit 109 forms a toner image on a recording sheet on the basis of the image data, and ejects the recording sheet from image forming apparatus 1 (step SA4).

After completion of an image output operation on the basis of PDL data 11, image forming apparatus 1 searches storage unit 105 for PDL data containing the user name "userA" which was input to enable image forming apparatus 1 to carry out an image output operation. Since storage unit 105 stores PDL data 12 as PDL data containing the user name "userA", PDL data 12 is found by image forming apparatus 1 (step SA5; YES). PDL data 12 is provided to image generating unit 200, and deleted from storage unit 105. On receipt of PDL data 12, image generating unit 200 generates image data of an image in which text contained in PDL data 12 is arranged on the basis of data indicating a position of the text in entry field A1, and subsequently, image forming unit 109 forms a toner image on a recording sheet on the basis of the generated image data (step SA6).

After completion of an image output operation on the basis of PDL data 12, image forming apparatus 1 searches storage unit 105 for PDL data containing the user name "userA" which was input to enable image forming apparatus 1 to carry out an image output operation (step SA5). Since storage unit 105 stores only PDL data 13 containing a user name "userB", no PDL data is provided to image generating unit 200 (step SA5; NO), and image forming apparatus 1 enters a standby mode (step SA7).

As described above, image forming apparatus 1 according to the present exemplary embodiment is able to form an image on a recording sheet even during a standby time. Specifically, image forming apparatus 1 is able to form an image on a recording sheet on the basis of PDL data associated with a user who performs an operation for enabling image forming apparatus 1 to carry out an image output operation, even during a standby time.

(Operation Performed when a Standby Time Starts While Image Forming Apparatus 1 is in the Process of Outputting an Image)

User A, who uses PC 10A in which a word processor program is running, inputs text in entry field A1 using a keyboard and/or a mouse, and if invoking a menu screen shown in FIG. 5 for configuring settings for printing, the menu screen is displayed. If user A inputs his/her user name "userA" in text box BX1 of the menu screen, inputs his/her password "AAA" in text box BX2, and clicks an OK button on the screen, PC 10A generates PDL data (hereinafter referred to as "PDL data 21") for instructing image forming apparatus 1 to form an image of the text input in entry field A1 on a recording sheet, in page description language. PC 10A sends PDL data 21 to image forming apparatus 1 via communication network 20. PDL data 21 is received by communication unit 110 of image forming apparatus 1.

After PDL data 21 is sent from PC 10A, user B, who uses PC 10B in which a word processor program is running, inputs text in entry field A1 using a keyboard and/or a mouse, and if invoking a menu screen shown in FIG. 5 for configuring settings for printing, the menu screen is displayed. If user B inputs his/her user name "userB" in text box BX1 of the menu screen, inputs his/her password "BBB" in text box BX2, and clicks an OK button on the screen, PC 10B generates PDL data (hereinafter referred to as "PDL data 22") for instructing image forming apparatus 1 to form an image of the text input in entry field A1 on a recording sheet, in page description language. PC 10B sends PDL data 22 to image forming apparatus 1 via communication network 20. PDL data 22 is received by communication unit 110 of image forming apparatus 1.

Subsequently, if user A clicks item "File" on toolbar T1 while a screen of FIG. 3 is displayed on PC 10A, pull-down menu P1 is displayed, as shown in FIG. 4. If user A clicks item "Open" in pull-down menu P1, a menu screen for opening a file is displayed, as shown in FIG. 6. If user A clicks a file name of a pre-prepared document file, and clicks an "Open" button, text stored in the document file is displayed in entry field A1.

If user A invokes a menu screen shown in FIG. 5 for configuring settings for printing, inputs his/her user name "userA" in text box BX1 of the menu screen, inputs his/her password "AAA" in text box BX2, and clicks an OK button on the screen, PC 10A generates PDL data for instructing image forming apparatus 1 to form an image of the text input in entry field A1 on a recording sheet, in page description language. PC 10A sends the PDL data (hereinafter referred to as "PDL data 23") to image forming apparatus 1 via communication network 20. PDL data 23 is received by communication unit 110 of image forming apparatus 1.

When image forming apparatus 1 receives items of PDL data 21 to 23, if the apparatus is in the process of a copy operation under control of a user, since the apparatus is not able to immediately carry out image output operations on the basis of the pieces of data, the apparatus stores the pieces of data in storage unit 105 in association with data of time at which each item of data is received.

After completion of the copy operation, image forming apparatus 1 compares a time indicated by a built-in clock and a standby time stored in storage unit 105 to determine whether the clock time is within the standby time. If the clock time is not within the standby time, image forming apparatus 1 provides PDL data 21, which is PDL data associated with the earliest time among PDL data stored in storage unit 105, to image generating unit 200, and deletes PDL data 21 from storage unit 105. On receipt of PDL data 21, image generating unit 200 generates image data of an image in which text contained in PDL data 21 is arranged on the basis of data indicating a position of the text in entry field A1, and subsequently, image forming unit 109 forms a toner image on a recording sheet on the basis of the generated image data.

Image forming apparatus 1 always monitors whether a time indicated by the built-in clock is within a standby time, and if a time indicated by the built-in clock enters the standby time while the image output operation on the basis of PDL data 21 is in progress, stores the user name "userA" contained in PDL data 21 that has been provided to image generating unit 200 (step SB1 of FIG. 9). However, image forming apparatus 1 proceeds with the image output operation on the basis of PDL data 21 until a recording sheet with an image represented by the data is ejected from image forming apparatus 1.

After completion of the image output operation on the basis of PDL data 21 (step SB2; YES), image forming apparatus 1 determines whether PDL data is stored in storage unit 105. Since storage unit 105 stores PDL data 22 and PDL data 23, the result of the determination is affirmative.

Subsequently, image forming apparatus 1 searches storage unit 105 for PDL data containing the user name "userA" which was stored when a time indicated by the built-in clock entered the standby time.

Since storage unit 105 stores PDL data 23 as PDL data containing the user name "userA", PDL data 23 is found by image forming apparatus 1 (step SB4; YES). PDL data 23 is provided to image generating unit 200, and deleted from storage unit 105. On receipt of PDL data 23, image generating unit 200 generates image data of an image in which text contained in PDL data 23 is arranged on the basis of data indicating a position of the text in entry field A1, and subsequently, image forming unit 109 forms a toner image on a recording sheet on the basis of the generated image data (step SB5).

After completion of the image output operation on the basis of PDL data 23, image forming apparatus 1 again determines whether PDL data is stored in storage unit 105 (step SB3). Since storage unit 105 stores PDL data 22, the result of the determination is affirmative.

Subsequently, image forming apparatus 1 searches storage unit 105 for PDL data containing the user name "userA" which was stored when a time indicated by the built-in clock entered the standby time. However, since storage unit 105 stores only PDL data 22 containing the user name "userB" (step SB4; NO), no PDL data is provided to image generating unit 200, and image forming apparatus 1 enters a standby mode (step SB6).

After that, if a time indicated by the built-in clock passes the standby time, image forming apparatus 1 provides PDL data 22 stored in storage unit 105 to image generating unit 200. On receipt of PDL data 22, image generating unit 200 generates image data of an image in which text contained in PDL data 22 is arranged on the basis of data indicating a position of the text in entry field A1, and subsequently, image forming unit 109 forms a toner image on a recording sheet on the basis of the generated image data.

[Modifications]

The above exemplary embodiment may be modified as described below.

The control program for realizing the above-mentioned operation may be stored in a recording medium such as a flexible disk, an optical disk, or a magnetic optical disk, and installed in image forming apparatus 1 from the recording medium. Alternatively, the control program may be sent to image forming apparatus 1 via communication network 20, and installed in image forming apparatus 1.

Figure 10:
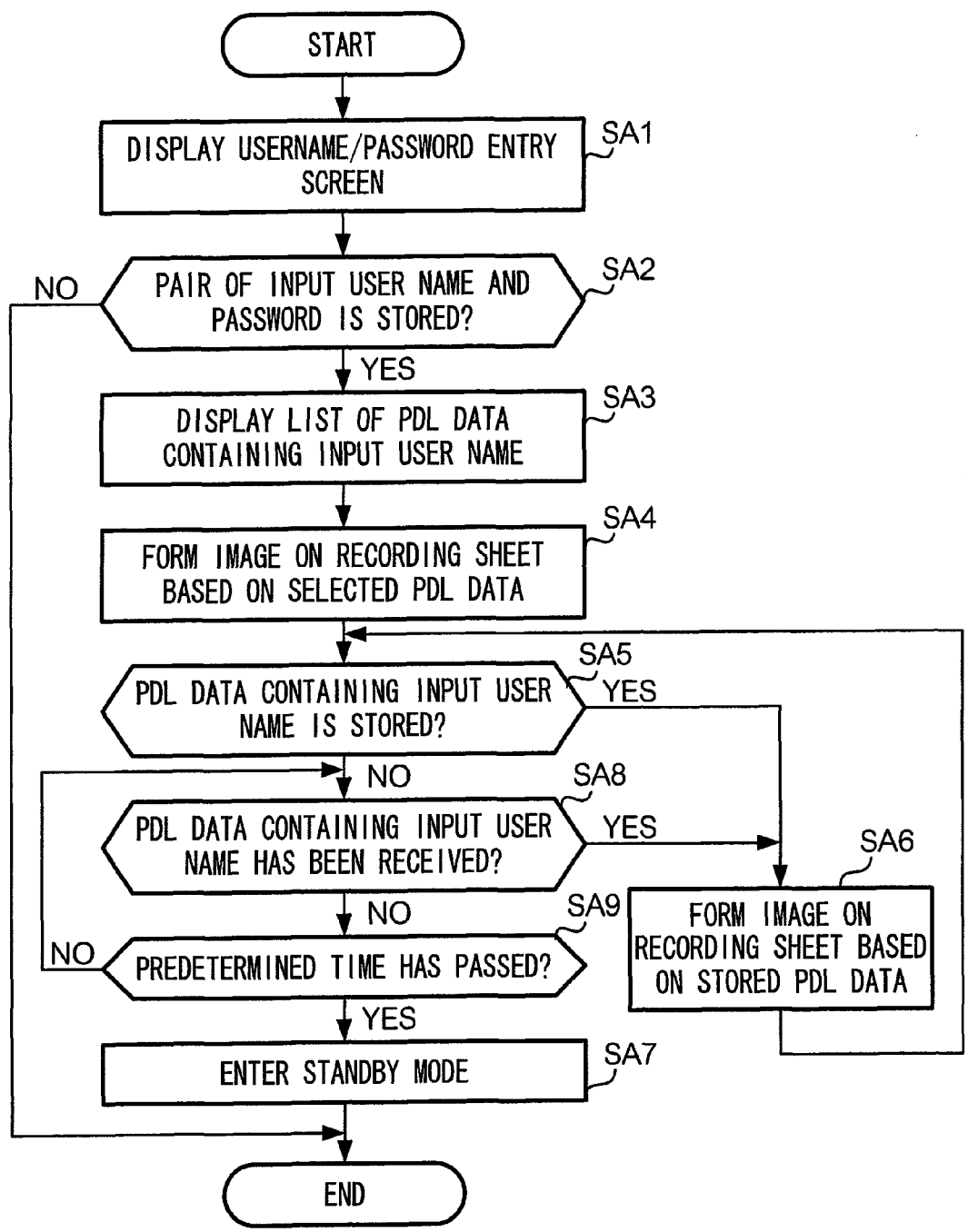
FIG. 10 is a flowchart showing an operation performed by image forming apparatus 1 according to a modification of the present invention.

In the above exemplary embodiment, image forming apparatus 1 may operate as shown in a flowchart of FIG. 10, when the apparatus is operated directly by a user. Specifically, image forming apparatus 1 may, if a determination at step SA5 is negative, determine whether it has received PDL data containing a user name input at step SA1. If image forming apparatus 1 has received PDL data containing the user name (step SA8; YES), the apparatus may carry out an operation of step SA6, and if image forming apparatus 1 has not received PDL data containing the user name for a predetermined time (step SA9; YES), the apparatus may enter a standby mode (step SA7).

Figure 11:
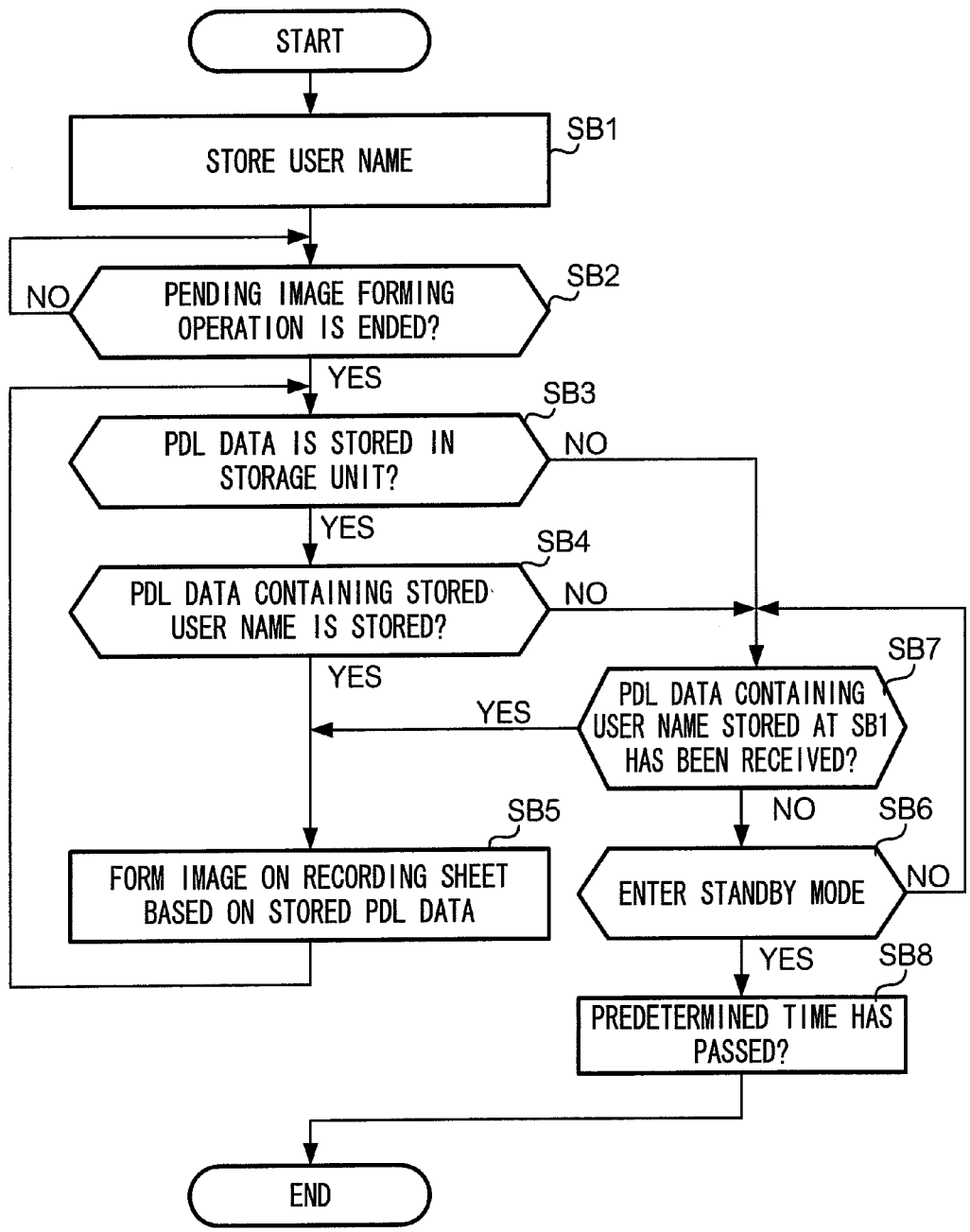
FIG. 11 is a flowchart showing an operation performed by image forming apparatus 1 according to a modification of the present invention.

In the above exemplary embodiment, image forming apparatus 1 may operate as shown in a flowchart of FIG. 11, when a standby time starts while the apparatus is in the process of outputting an image. Specifically, image forming apparatus 1 may, if a determination at step SB3 or step SB4 is negative, determine whether it has received PDL data containing a user name input at step SB1. If image forming apparatus 1 has received PDL data containing the user name (step SB7; YES), the apparatus may carry out an operation of step SB5, and if image forming apparatus 1 has not received PDL data containing the user name for a predetermined time (step SB8; YES), the apparatus may enter a standby mode (step SB6).

In the above exemplary embodiment, PC 10A or 10B may have a computer name and a password, and generate PDL data containing the computer name and the password, and image forming apparatus 1 may store a computer name and a password of PC 10A or 10B in association with each other.

According to the present modification, if a computer name and a password are input while image forming apparatus 1 is in a standby mode, and a screen shown in FIG. 7 is displayed, at step A3 a list of file names of items of PDL data containing the input computer name may be displayed, at step SA5 it may be determined whether PDL data containing the input computer name is stored in storage unit 105, and at step SA8 it may be determined whether PDL data containing the input computer name has been received.

Also, in the flowcharts of FIGS. 9 and 11, at step SB1 a computer name contained in PDL data may be stored by image forming apparatus 1, at step SB4 it may be determined whether PDL data containing the stored computer name is stored in storage unit 105, and at step SB7 it may be determined whether PDL data containing the stored computer name has been received.

In the above exemplary embodiment, when a determination at step SA2 of FIG. 8 is affirmative, it may be determined whether PDL data containing an input user name is stored in storage unit 105, and if the determination is negative, an operation of step SA7 may be performed. Also, in the above-mentioned flowchart of FIG. 10, when a determination at step SA2 is affirmative, it may be determined whether PDL data containing an input user name is stored in storage unit 105, and if the determination is negative, an operation of step SA8 may be performed.

In the above exemplary embodiment, a user name and a password may be stored in storage unit 105 and contained in PDL data, after being encrypted. In this case, image forming apparatus 1 may, if storing an encrypted version of an input user name and password, carry out an image output operation on the basis of PDL data containing the encrypted user name.

In the above exemplary embodiment, the PDL data may not contain a user name. In this case, image forming apparatus 1 may carry out an image output operation on the basis of PDL data containing an input password. Alternatively, in the above exemplary embodiment, PDL data may not contain a password. Alternatively, in the above exemplary embodiment, data other than a user name and a password may be contained in PDL data, as long as a user is uniquely identified on the basis of the data. Specifically, the data may be an identification number including letters and numerals assigned to a user, or biometric data such as fingerprint data obtained in PC 10A or 10B, or image forming apparatus 1. In the latter case, image forming apparatus 1 may, if storing obtained biometric data as user data, carry out an image output operation on the basis of PDL data containing the obtained biometric data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principle of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An image output apparatus comprising;
a memory configured to store user identification data;
a receiver configured to receive image data and user identification data;
an input unit by use of which a user inputs his/her user identification data;
a clock; and
an image forming unit that:
if a time indicated by the clock is within a predetermined standby time, suspends outputting of an image represented by image data received by the receiver; and
if user identification data input using the input unit during the predetermined standby time is stored in the memory, outputs an image represented by image data, which is associated with the input user identification data, from among items of image data received by the receiver and not yet output.

2. The image output apparatus according to claim 1, wherein the image forming unit, if user identification data input using the input unit during the predetermined standby time is stored in the memory, and the input identification data and image data are received by the receiver in a predetermined time period since the input of the user identification data using the input unit, outputs an image represented by the received image data.

3. An image output apparatus comprising:
a receiver configured to receive image data and user identification data;
a memory configured to store image data and user identification data received by the receiver;
a clock; and
an image output unit that:
if a time indicated by the clock is not within a predetermined standby time, outputs an image represented by image data stored in the memory; and
if a time indicated by the clock enters a predetermined standby time while the image output unit is in a process of outputting an image, identifies user identification data associated with image data representing the image, and outputs an image represented by image data, which is associated with the identified user identification data, from among items of image data stored in the memory, even if a time indicated by the clock is within the predetermined standby time.

4. The image output apparatus according to claim 3, wherein the image output unit, if the identified user identification data and the image data associated with the identified user identification data are received by the receiver within a predetermined time period since identification of the user identification data during the predetermined standby time, outputs an image represented by the image data.

5. An image output apparatus comprising:
a receiver configured to receive image data together with identification data;
an input unit by use of which identification data is input;
an image data identifying unit that identifies image data associated with identification data input using the input unit from among items of image data received by the receiver; and
a controller that in a predetermined time period causes an image output unit to output an image represented by the image data identified by the image data identifying unit, and not to output an image represented by image data other than the identified image data.

6. An image output apparatus comprising:
a receiver configured to receive image data together with identification data;
an input unit by use of which identification data is input,
an image data identifying unit that identifies image data associated with identification data input using the input unit from among pieces of image data received by the receiver; and
a controller that:
in a predetermined standby time causes an image output unit to suspend outputting of an image represented by image data received by the receiver; and
if the identification data associated with the image data identified by the image data identifying unit is input using the input unit during the predetermined standby time, causes the image output unit to output an image represented by the identified image data.

7. An image output apparatus comprising:
a receiver configured to receive image data associated with a user;
an input unit by use of which user identification data and user authentication data are input;
an authentication unit that authenticates a user on the basis of the user identification data and the user authentication data input using the input unit;
an image data identifying unit that identifies image data associated with the user authenticated by the authentication unit from among items of image data received by the receiver; and
a controller that in a predetermined time period causes an image output unit to output an image represented by the image data identified by the image data identifying unit, and not to output, an image represented by image data other than the identified image data.

8. An image output method for a computer comprising:
storing user identification data in a memory;
receiving with a receiver image data and user identification data;

inputting by an input unit user identification data; and if a time indicated by a clock is within a predetermined standby time, suspending outputting of an image represented by image data received by the receiver; and if user identification data input using the input unit during the predetermined standby time is stored in the memory, outputting an image represented by image data, which is associated with the input user identification data, from among items of image data received by the receiver and not yet output.

9. A non-transitory computer readable medium storing a program for causing a computer to perform steps comprising:

storing user identification data in a memory;

receiving with a receiver image data and user identification data;

inputting user identification data input by an input unit; and executing a process for outputting an image, the process comprising:

if a time indicated by a clock is within a predetermined standby time;

suspending outputting of an image represented by image data received by the receiver; and if user identification data input using the input unit during the predetermined standby time is stored in the memory, outputting an image represented by image data, which is associated with the input user identification data, from among items of image data received by the receiver and not yet output.

10. A non-transitory computer readable medium storing a program for causing a computer to perform steps comprising:

with a receiver receiving image data and user identification data;

storing in a memory image data and user identification data received by the receiver; and executing a process for outputting an image, the process comprising:

if a time indicated by a clock is not within a predetermined standby time, outputting an image represented by image data stored in the memory; and if a time indicated by the clock enters a predetermined standby time while the computer is in a process of outputting an image, identifying user identification data associated with image data representing the image, and outputting an image represented by image data which is associated with the identified user identification data, from among items of image data stored in the memory, even if a time indicated by the clock is within the predetermined standby time.

* * * * *